United States Patent
Hao et al.

(10) Patent No.: US 8,632,864 B2
(45) Date of Patent: Jan. 21, 2014

(54) DECORATIVE SURFACE FINISH AND METHOD OF FORMING SAME

(75) Inventors: Ling Hao, Grand Rapids, MI (US); David P. Hartrick, Plainwell, MI (US); Lee A. Chase, East Grand Rapids, MI (US); Alan D. Fanta, East Grand Rapids, MI (US); Daniel W. Irvine, Kentwood, MI (US); Yong Zhang, Grand Rapids, MI (US); Maoshi Guan, Kentwood, MI (US)

(73) Assignee: Lacks Industries, Inc., Bloomfield Hills, MI (US)

( * ) Notice: Subject to any disclaimer, the term of this patent is extended or adjusted under 35 U.S.C. 154(b) by 338 days.

(21) Appl. No.: 12/545,926

(22) Filed: Aug. 24, 2009

(65) Prior Publication Data

US 2011/0045317 A1    Feb. 24, 2011

(51) Int. Cl.
   *B32B 15/00* (2006.01)

(52) U.S. Cl.
   USPC .......... 428/29; 428/195.1; 428/567; 428/615; 428/621; 428/687; 428/908.8; 428/912.2

(58) Field of Classification Search
   USPC ............. 428/195.1, 209, 187, 912.2, 29, 567, 428/615, 621, 687, 908.8
   See application file for complete search history.

(56) References Cited

U.S. PATENT DOCUMENTS

| | | | |
|---|---|---|---|
| 3,616,296 A * | 10/1971 | Bernhardt et al. | 205/167 |
| 4,101,698 A * | 7/1978 | Dunning et al. | 428/31 |
| 4,115,619 A * | 9/1978 | Kurfman et al. | 428/336 |
| 4,350,550 A * | 9/1982 | Van Manen | 156/237 |
| 4,514,471 A | 4/1985 | Sugimoto et al. | |
| 4,826,713 A * | 5/1989 | Cook | 428/31 |
| 4,877,657 A * | 10/1989 | Yaver | 428/31 |
| 4,999,227 A * | 3/1991 | Vander Togt | 428/31 |
| 5,532,045 A * | 7/1996 | Wade | 428/187 |
| 6,071,621 A * | 6/2000 | Falaas et al. | 428/425.8 |
| 6,641,921 B2 * | 11/2003 | Falaas et al. | 428/425.8 |
| 7,144,540 B2 * | 12/2006 | Tziovaras et al. | 264/328.1 |
| 7,384,532 B2 * | 6/2008 | Parsons et al. | 205/159 |
| 7,507,363 B2 * | 3/2009 | Meyer et al. | 264/347 |

FOREIGN PATENT DOCUMENTS

| | | |
|---|---|---|
| DE | 3231845 A1 | 3/1983 |
| DE | 102004032013 A1 | 1/2006 |
| EP | 0228003 A1 | 7/1987 |
| EP | 0293198 A2 | 11/1988 |
| JP | 49038932 A | 4/1974 |
| SU | 528359 A1 | 9/1976 |
| WO | 0171067 A2 | 9/2001 |
| WO | 2006001487 A2 | 2/2006 |
| WO | 2006014817 A2 | 2/2006 |
| WO | 2007088217 A1 | 8/2007 |

OTHER PUBLICATIONS

International Search Report, Dated Oct. 7, 2010, 4 Pages.

* cited by examiner

*Primary Examiner* — Cathy Lam
(74) *Attorney, Agent, or Firm* — Dickinson Wright PLLC

(57) ABSTRACT

A decorative metal finish for a part with a non-conductive surface where the non-conductive surface is lightly roughened to improve its adherence capabilities. A thin metal layer is electrolessly deposited on the lightly roughened surface to provide a bright durable metal finish on the non-conductive surface. An translucent finish is deposited over the thin metal layer to provide protection for the metal finish.

38 Claims, 5 Drawing Sheets

DECORATIVE SURFACE FINISH AND METHOD OF FORMING SAME

TECHNICAL FIELD

The present invention relates generally to a decorative finish for a plastic surface. More particularly, the present invention relates to a decorative finish for a plastic surface that results in a durable high quality reflective decorative metal appearance.

BACKGROUND INFORMATION

Chrome plating is a process that has been utilized for many years to provide a decorative chrome finish on a metal surface. One particular application for chrome plating has been in the automotive industry where the appearance of metal finishes is a significant concern. While chrome plating of metal surfaces has been utilized for many years, it is expensive and has corrosion issues.

Over time, alternatives to these metal chrome plating processes have been developed. Some of these developments were made in response to concerns over the use and disposal of hexavalent chromium and heavy metals typically used in the plating process. Additionally, regulations surrounding the use of hexavalent chromium have become more restrictive, causing efforts aimed at developing alternative technologies to correspondingly increase. A number of commercial chemistries using trivalent chromium have been offered as replacements for hexavalent chromium in the plating process to address these concerns. Processes using these chemistries, however, provide decreased corrosion protection and are significantly more expensive. Further, while trivalent chromium does not possess the same toxicity as hexavalent chromium, it still poses environmental challenges. These developments thus have not produced commercially viable alternatives to metal chrome plating processes.

It is known that the use of metal as a base material provides a part that is heavy and expensive. Thus, alternative processes were developed that involved substituting plastic for metal as the base material such that a metal surface is plated over the plastic base material. One such process involves etching the plastic surface of the article and then depositing an active catalyst on the etched surface. Thereafter, a layer of metal is plated onto the surface via an electroless process. In accordance with this process, copper layers are then electrolytically deposited thereon for leveling and conductivity purposes. Additionally, nickel layers are deposited on top of the copper layers for leveling and corrosion protection. Lastly, a final chromium layer is added to the surface for color and reflectivity. This process yields an article that is durable, corrosion resistant, and highly reflective making it suitable for exterior and interior automotive applications.

In accordance with this process, to provide the increased durability over prior processes, the surface of the plastic substrate is aggressively roughened to provide adequate adhesion between the plastic surface and the deposited metal. The surface is typically aggressively roughened to achieve a root mean square roughness in excess of a few microns. This aggressive roughening provides mechanical interlocks that are capable of allowing adherence of a metal surface thereto under a wide range of temperatures and mechanical stresses. Additionally, to ensure durability of the metal finish created with these prior processes, the metal layers applied to the substrate have a relatively large thickness, which is typically in the range of 40 microns or more. A primary reason for the relatively large thickness with these prior metal finishes results from the need for leveling of the metal layers. Application of a thick layer of metal to the aggressively roughened surface provides sufficient adherence and durability to withstand high temperatures and stresses, such as those encountered in the automotive industry and other similar applications. While this process is commercially successful, it would be desirable to develop an improved process that has decreased cost and/or yields other benefits.

Another alternative to metal chrome plating that has been developed and utilized is vacuum metalizing. Vacuum metalizing has the benefit of providing a more reflective metal surface than prior chrome plating processes. However, vacuum metalizing is extremely costly, is a time consuming process, and has size and part restrictions. For example, vacuum metalizing is not suitable for parts having complex geometry or being of a large size. Additionally, parts subjected to vacuum metalizing have limited durability. Vacuum metalizing therefore has only limited applications and poses some substantial disadvantages.

Other technologies for plating plastic surfaces have also been commercialized. In accordance with one process, a base coat is deposited on a substrate material and then a spray-on silver metal is deposited over the base coat to provide a reflective surface. Next, a tinted clear protective top coat is applied over the silver metal deposit. With this process, the reflective silver layer is attained by spraying two water-based formulations, a silver salt solution and a reducing solution, at the same time through a specialized dual-nozzle spray gun. The two solutions mix and react directly in front of the gun's nozzles, yielding a fine mist of silver metal which deposits on the base coat surface. While this process provides a finish with a pleasant appearance, it does not have sufficient durability for automotive applications, due in part to its inability to withstand known thermal shock tests. Moreover, this technology has volume restrictions and can only be utilized with surfaces having relatively simple configurations.

Still another alternative to metal chrome plating processes is tin-cobalt alloy electroplating, which has been utilized in applications in the furniture industry. While tin-cobalt alloy electroplating provides a quality metal appearance, its durability is limited as well as its corrosion resistance. The durability and corrosion resistance may be acceptable for the furniture industry, however, it cannot withstand the stringent performance requirements of automotive applications and other applications requiring a durable metal finish such as consumer electronics.

It would therefore be desirable for economic and environmental reasons to develop an alternative technique or process capable of providing durable reflective decorative finishes that can be utilized in industries where the surfaces would be subjected to environmental and mechanical stresses and that can be produced in mass volume without restrictions on part size or geometry and yields cost savings.

SUMMARY OF THE INVENTION

It is therefore an advantage of the present invention to provide a durable decorative metal finish and a method of forming same on a plastic or other non-conductive surface that uses less metal than current conventional chrome plating techniques.

It is another advantage of the present invention to provide a durable decorative metal finish and a method of forming same on a plastic or other non-conductive surface that does not require a layer of chromium as part of the finish.

It is a further advantage of the present invention to provide a durable decorative metal finish and a method of forming same on a plastic or other non-conductive surface that requires less surface roughening than current conventional chrome plating techniques on plastic.

It is still another advantage of the present invention to provide a durable decorative metal finish and a method of forming same on a plastic or other non-conductive surface that can be achieved using existing wet chemical methods and that does not require the use of expensive capital intensive investments.

It is yet another advantage of the present invention to provide a durable decorative metal finish and a method of forming same on a plastic or other non-conductive surface that is less expensive than prior processes and provides a high quality appearance.

It is still yet another advantage of the present invention to provide a durable decorative metal finish and a method of forming same on a plastic or other non-conductive surface that is more environmentally friendly than conventional chrome plating techniques.

It is a further advantage of the present invention to provide a durable decorative metal finish and method of forming same on a plastic or other non-conductive surface that exhibits better corrosion resistance as compared to conventional chrome plating techniques.

It is still a further advantage of the present invention to provide a durable decorative metal finish and method of forming same on a plastic or other non-conductive surface that allows for the creation of multiple colored finishes.

In accordance with the above and the other advantages of the present inventions an improved decorative metal finish for a part with a non-conductive surface is provided. The non-conductive surface of that part is lightly roughened to improve its adherence capabilities. A thin metal layer is electrolessly deposited on the lightly roughened surface to provide a bright durable metal finish on the non-conductive surface, including, for example, through immersion in an aqueous bath. A translucent coating layer is deposited over the thin metal layer to provide added protection for the metal finish. The light roughening of the non-conductive surface and the thin metal layer deposited thereover surprisingly provides a high quality finish with excellent durability for high stress applications.

These and other features and advantages of this invention will become more apparent to those skilled in the art from the detailed description of a preferred embodiment. The drawings that accompany the detailed description are described below.

DETAILED DESCRIPTION

Figure 1:
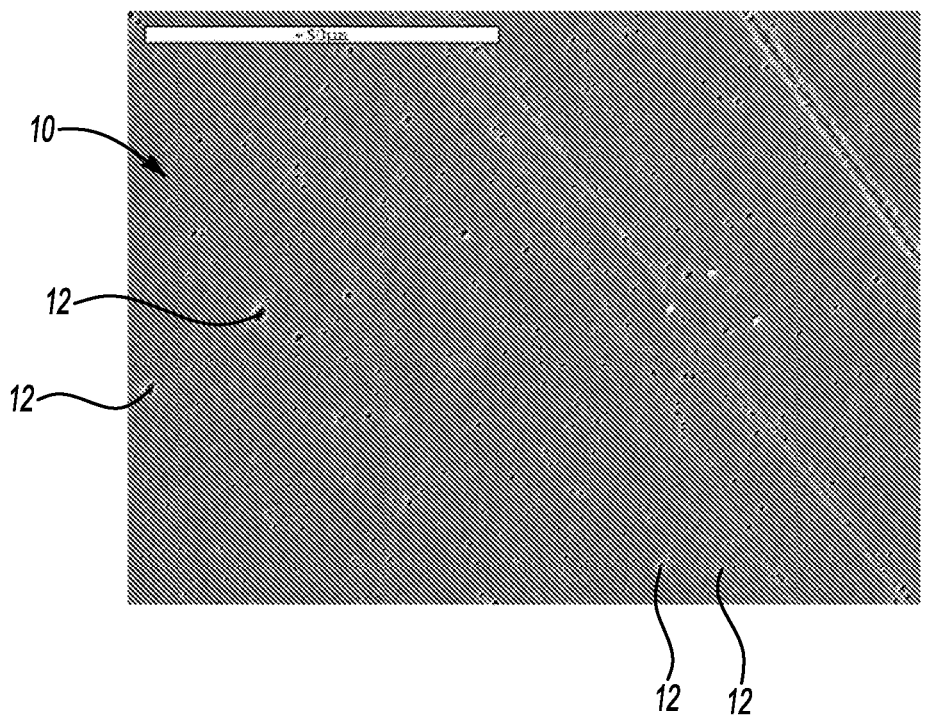
FIG. 1 is a schematic illustration of a lightly roughened surface in accordance with a preferred embodiment of the present invention.

In accordance with the present invention, a decorative metal finish for a plastic or other non-conductive surface is provided. The preferred decorative metal finish is advantageous for surfaces that are curved and which may have complex curvatures. The preferred decorative metal finish can also be utilized in connection with flat surfaces or sheets or other differently configured surfaces. The preferred decorative metal finish is also extremely durable and capable of withstanding external environmental conditions and mechanical loads and stresses, such as those encountered in the automotive industry. Automotive components that may be advantageously provided with a highly reflective decorative surface in accordance with the present invention include interior automotive trim components, such as interior door handles as well as exterior automotive trim components, such as radiator grills, exterior door handles, and headlight assembly components. Obviously, the present invention can also be applied to other automotive components.

While preferred applications for the present invention are in the automotive industry, it will be understood that the present invention can be utilized in connection with a variety of other applications in a multitude of different industries, such as furniture, consumer electronics, kitchen appliance housings (e.g. refrigerators, stoves, microwave ovens, dishwashers, etc.), mailboxes, and residential and commercial building components. Consumer electronics housing components that may be advantageously provided with a highly decorative surface in accordance with this invention include housing components for cellular telephones. Additionally, in accordance with the present invention, a method of providing a decorative metal finish on a plastic or other non-conductive surface is provided, that yields a high quality finish, is less expensive, and is environmentally friendly. While the preferred embodiment utilizes a plastic substrate, it will be understood that any non-conductive material may be utilized. For example, in addition to polymeric materials, other non-conductive materials such as rubber, ceramic, and wood may alternatively be utilized in accordance with the present invention. It will be appreciated that other non-conductive materials may also be utilized.

The decorative metal finish of the present invention goes against conventional wisdom and the state of the art in metal finishing of surfaces for decorative purposes. In fact, those of ordinary skill in the art have long believed and taught that to successfully and durably plate (overlay) metals on plastic substrates, the plastic substrates must be aggressively roughened or etched in order to provide sufficient mechanical interlock or keylocks between the plastic substrate and the overlying metal surface. According to this belief, to achieve a sufficient mechanical interlock, the surface of the plastic substrate must contain sufficient porosity, which will be filled with the overlying metal, such as electroless copper or nickel, to provide adhesion of the plated metal to the plastic surface. However, as is also known, with an aggressively etched surface, an electroless metal deposit does not yield the desired bright reflective finish. Instead, the metal deposit only replicates the surface onto which the metal is plated, which results in a dull finish that is not optimum for decorative applications. These processes therefore employ baths formulated with brighteners or levelers to provide smooth gloss finishes. However, the leveling mechanism of these additives can only work in electrolytic baths to achieve this desired aim, which is considered undesirable due to added cost and energy consumption. As is known, an electrolytic bath is one where an electric current is applied to the solution to accomplish deposition of the metal layer on the plastic surface.

It is well known that the degree of adhesion between the plastic surface and the plated metal must be sufficient to withstand impacts and repeated temperature cycling, particularly for automotive applications. Accordingly, those skilled in the art of plating on plastic have long taught utilization of an aggressive etch of the plastic substrate to achieve sufficient adhesion of the metal thereto. Additionally, in conventional decorative plating, relatively thick layers of electrolytic copper and nickel plating are deposited onto the aggressively roughened surfaces, as is discussed in more detail below. Thus, it was believed that aggressive etching of the plastic surface with a thick metal deposited thereon was necessary to achieve suitable durability.

Conversely, contrary to the above conventional techniques, the present invention provides a decorative metal finish where the surface of the plastic substrate is mildly or lightly roughened or etched before a relatively thin metal layer is deposited thereon. Specifically, the applicants unexpectedly and surprisingly discovered that excellent adhesion and durability of finish could be obtained even with only a mild roughening of the substrate surface. The reason for this appears to result from the deposit of the thin metal layer on the surface and hence the reduced mass of the film per unit of substrate surface and the drastic reduction in tensile and compression stress inherent in the electroplated deposited thick metal layers. In accordance with the present invention, as discussed in more detail below, a durable, corrosion resistant metal finish is provided, which uses less material, uses fewer and simpler process steps, and inherently generates less waste.

Figure 2:
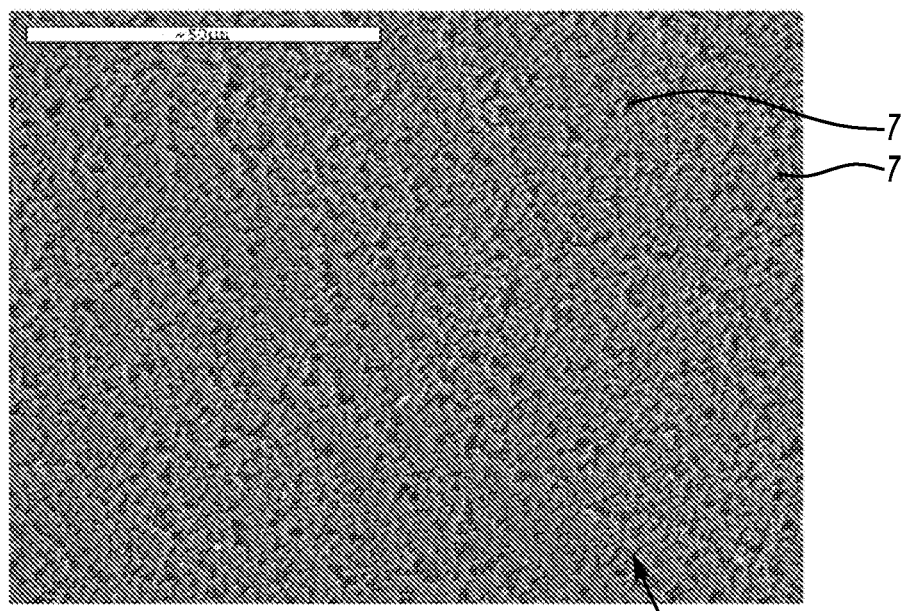
FIG. 2 is a schematic illustration of an aggressively roughened surface in accordance with prior metal finishes and processes for forming same.

With reference to the Figures, FIGS. 1 and 2 illustrate the differences between the degrees of roughening of the plastic surfaces between the present invention and prior processes. Initially, FIG. 1 schematically illustrates a plastic surface 10 that has been lightly roughened in accordance with a preferred embodiment of the present invention. More specifically, FIG. 1 is representative of an ABS surface 10, which has been subjected to light etching, as depicted under an SEM microscope as magnified 1000 times. It will be appreciated that FIG. 1 is merely representative of a lightly or mildly roughened surface and that the surface can have a variety of different configurations and appearances and still be lightly or mildly roughened in accordance with the present invention. As can be seen, FIG. 1 contains a limited number of etch sites, generally indicated by reference number 12, on the surface of the plastic part. This configuration results from the light etch bath, which maintains much of the original smooth surface of the plastic article. It will be appreciated that the degree of mild or light roughening can vary as desired.

In comparison, FIG. 2 schematically illustrates a plastic surface 5 that has been aggressively roughened in accordance with prior processes. FIG. 2 is also representative of an ABS surface 5, which has been subjected to rough or aggressive etching, as depicted under an SEM microscope as magnified 1000 times. As shown in FIG. 2, the surface obtained after the normal etch contains pits or etch sites, generally indicated by reference number 7, that are substantially larger and deeper than those in FIG. 1. This configuration results from the aggressive etch bath, which provides significant pits and/or valleys 7 in the surface of the plastic articles.

Figure 3:
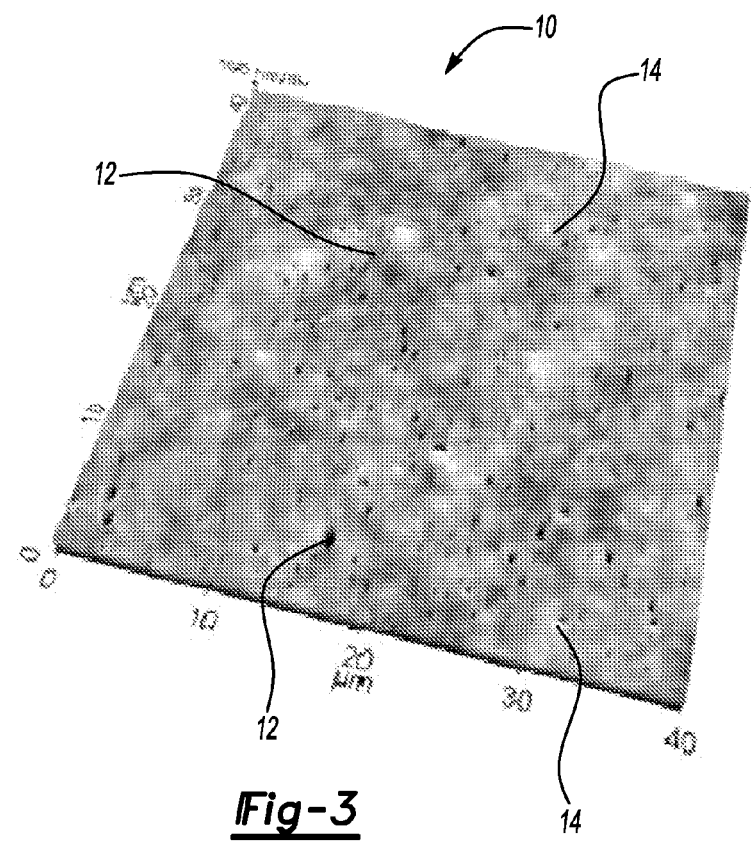
FIG. 3 is a schematic illustration of a lightly roughened surface as depicted by Atomic Force Microscopy in accordance with a preferred embodiment of the present invention.
Figure 4:
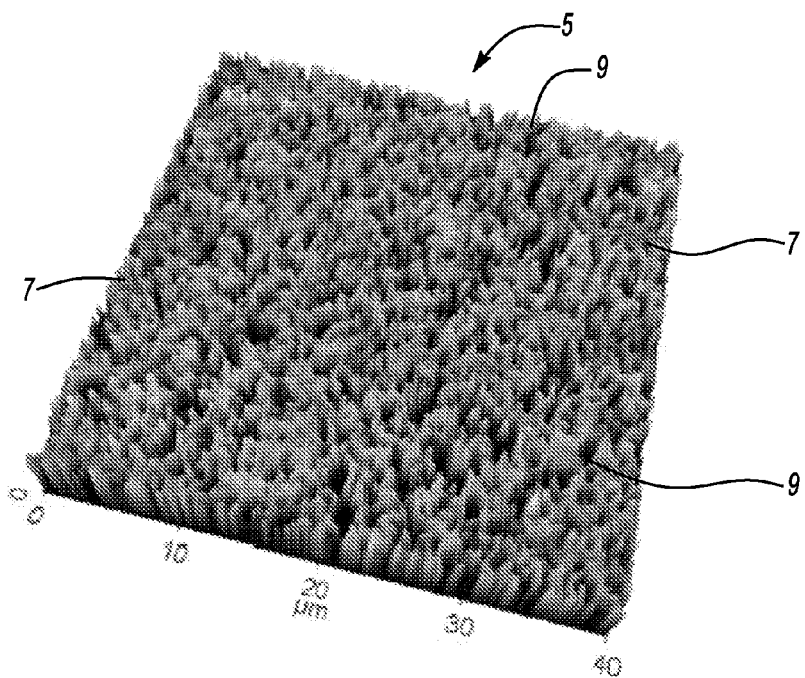
FIG. 4 is a schematic illustration of an aggressively roughened surface as depicted by Atomic Force Microscopy in accordance with prior processes.

The overall roughness of a surface can also be quantitatively measured, such as by Atomic Force Microscopy (AFM). In that light, samples representative of the etch conditions represented by FIGS. 1 and 2 were measured by this procedure in 40×40 micron sections. As the arm of an AFM travels across the surface of a part, it maps the surface configuration. Thus, as the AFM arm travels across the surface of the part 10 etched in accordance with the present invention, it maps the pits 12 and peaks 14, which are schematically illustrated in FIG. 3. Similarly, as the AFM arm travels across the surface of the part 5 etched in accordance with prior processes, it maps the pits 7 and peaks 9, which are schematically illustrated in FIG. 4. The pits 7 and 12 of these surfaces are generally represented by a dark color in FIGS. 4 and 3, respectively. The lighter portions of the surfaces denote peaks 9, 14 in the molded part. The part 10 shown in FIG. 3 includes pits 12 that are discreet and separated by distinct areas of smooth plastic. As will be appreciated, the size of the holes or pits is related to the amount of plastic that is etched out or removed during the roughening process and thus the holes or pits are small. In contrast, as shown in FIG. 4, the aggressively etched surface shows far more surface roughness with a somewhat "honeycomb" like series of voids, which are required to provide for the enhanced adhesion needed for thick electrolytic metal deposits.

As is evident from the table below, the light etch surface is similar in its characteristics to the raw molding with no etch whatsoever. As shown in the table, the roughness values of the light etch rise only slightly when compared to the raw molding whereas the aggressive etching distorts the surface to a much higher degree.

| Roughness | As Molded Surface | Lightly Etched Surface | Aggressively Etched Surface |
|---|---|---|---|
| $R_a$ (nm) average | 15.5 | 16.5 | 111.4 |
| $R_q$ (nm) RMS | 22.7 | 24.7 | 142.3 |

It can thus be seen that a light etching in accordance with the present invention distorts the raw surface slightly, but does not require the severe distortion previously thought necessary and which results from aggressive etching or roughening of the surface. Again, the degree of light etching can obviously vary.

Figure 5:
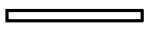
FIG. 5 is a schematic illustration of a non-conductive surface with thin layers of a metal finish deposited thereon in accordance with a preferred embodiment of the present invention.
Figure 5:
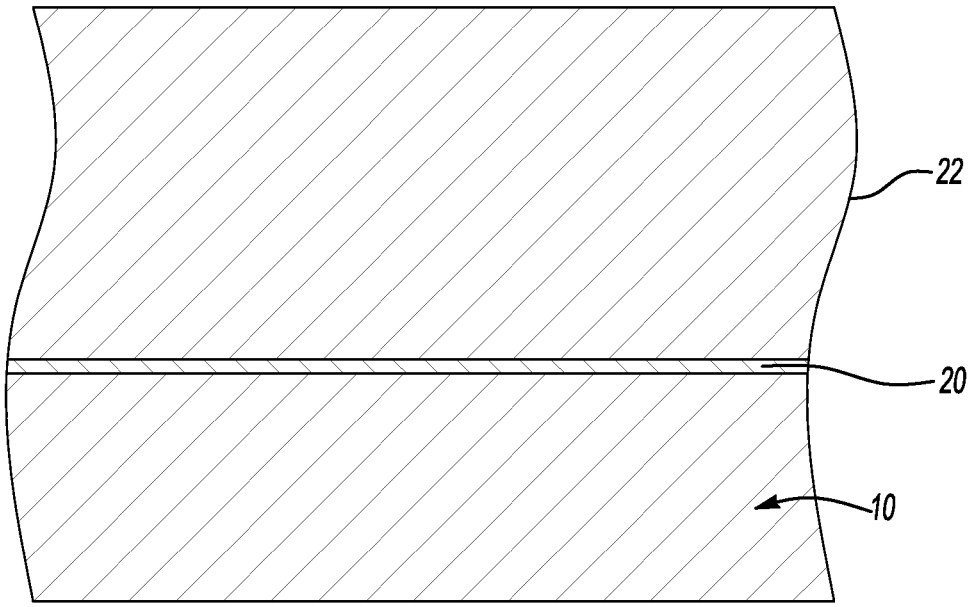

Referring to FIG. 5, which schematically illustrates a completed metal finish in accordance with a preferred embodiment of the present invention. As shown, the plastic or other non-conducting surface 10 is subjected to a light or mild roughening process, as detailed herein. In accordance with this embodiment, the surface 10 is an ACRYLONITRILE BUTADINENE STYRENE (ABS) substrate. Thereafter, a thin metal layer 20, e.g. bright electroless nickel, is deposited on the lightly etched surface 10. In accordance with a preferred embodiment, the thickness of the metal layer 20 is on the order of about 100 nanometers. However, the thickness of the metal layer can obviously vary. For example, the thickness of the metal layer can be greater or less than 100 nanometers (nm). Indeed, the thickness of the metal layer is preferably in the range of 50 nm to 500 nm. In accordance with the present invention, the amount of total metal is substantially less than with prior processes, as discussed below. Due to the application of a thinner layer of metal 20, the mechanical stresses at the metal to plastic interface are substantially lowered. These lowered stresses require fewer anchor sites in the plastic to adequately adhere the metal layer to the substrate.

In accordance with a preferred embodiment, the thin layer of metal 20 is applied to the lightly or mildly etched plastic surface using a non-electrolytic plating technique. The term "non-electrolytic plating" technique as used herein generally refers to any technique for depositing a thin metal coating layer without making the article to be plated a cathode in an electrochemical process. Examples of non-electrolytic plating techniques include various physical vapor deposition and chemical vapor deposition processes, electroless plating and immersion plating. It was also surprising to learn that it was possible to obtain excellent adhesion of a very thin metal deposit on a lightly etched plastic surface with an electroless plating process. Additionally, the quality of the finish was superior to that obtained by the more traditional aggressive etch due to the fact that the smooth injection molded plastic surface was not altered as much by etch chemistry. Consequently, the present invention provides a smooth, highly reflective and decorative appearance, without depositing relatively thick layers employing leveling agents, because of the substantially reduced roughening of the substrate and the thinness of the deposited metal layer.

Figure 6:
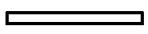
FIG. 6 is a schematic illustration of a plastic surface with layers of a metal finish deposited thereon in accordance with prior metal finishing processes.
Figure 6:
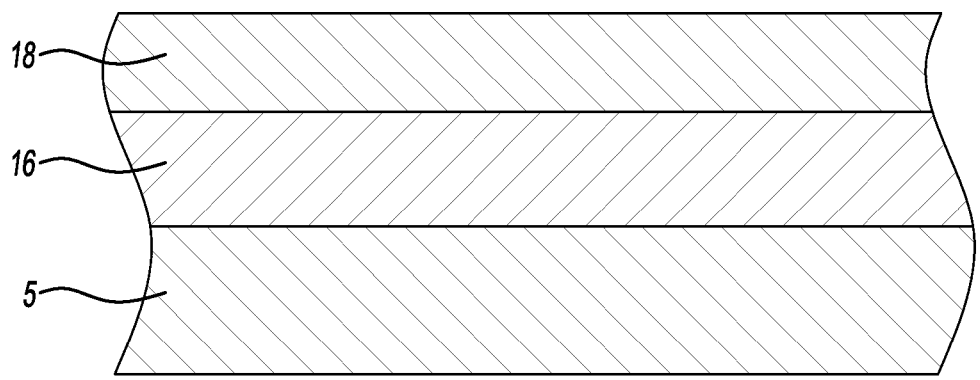

The difference between the constructions of traditional chrome plating on plastic and the process described in the preferred embodiments are apparent when FIG. 5 is compared to FIG. 6. FIG. 6 illustrates a metal finish on a plastic substrate 5. In accordance with this prior process, the plastic substrate is aggressively etched. Thereafter, a thick metal layer is deposited thereon. The overall thickness of the typical metal layer deposited in connection with these prior parts is at least 40 microns and can consist of multiple layers. By way of example, these prior constructions consist first of a layer of copper 16 on the order of 15-30 microns that is plated over a plastic surface 5. The copper layer 16 is plated in the presence of brighteners that smooth the surface. The copper layer 16 also provides a conductive layer to subsequently plate the less conductive nickel layers 18 deposited thereon. The next layers are nickel layers 18 that typically have been on the order of 20 microns thick in order to provide the desired layer of corrosion protection. A chrome layer is also typically disposed over the nickel layers 18. However, the chrome layer is extremely thin and is not illustrated in the magnification levels reflected in FIG. 6. The net result is a relatively thick deposit of metal that needs sturdy anchor sites in the plastic resin for adequate adhesion. This is in contrast to the thin layer of metal utilized by the present invention.

By employing a metallization process that utilizes a light etch in conjunction with very thin metal depositions, it has been established that glossy reflective finishes can be obtained by electroless metal deposition on plastic surfaces. The light etch maintains a smooth surface on the molded part yet creates sufficient mechanical interlocks to trap the catalyst and plate electroless copper or nickel. At the same time, it was unexpectedly discovered that the thin coatings of metal were such that this slight degree of etching was also adequate to provide good adhesion therebetween.

In accordance with a preferred embodiment, the preferred metal that is electrolessly deposited on the surface is a electroless bright nickel to form the thin metal layer 20. However, other suitable electroless metal deposits may also be utilized to form the thin metal layer 20, including, for example, generic electroless nickel and electroless copper, as discussed in connection with some exemplary embodiments below. In accordance with one embodiment, an additional layer of decorative electroless nickel and/or electroless copper can be deposited over the first layer of electroless deposit which collectively have a total thickness of about 100 nm. However, the thickness of this metal layer can obviously vary. For example, the thickness of the metal layer can be greater or less than 100 nanometers (nm). Indeed, the thickness of the metal layer is more preferably in the range of 50 nm to 500 nm. Upon deposition of an electroless copper layer, whether directly onto the non-conductive surface 10 or on top of an electroless or bright electroless layer, a bright metallic finish can be obtained by depositing silver over the copper layer. The process of silver deposition is preferentially achieved without current passing through the articles, such as by means of either autocatalytic deposition or displacement reaction at the temperatures ranging from room temperature up to 160° F. and more preferably in the range of 90 to 120° F. The immersion time for this process is for a period of less than 10 minutes and more preferably in the range of 20 seconds to 2 minutes. These ranges can obviously vary. Alternatively, an electrolytic process can be employed to attain the same finish at a higher cost.

Further, in the event that additional leveling is desired to obtain increased quality finish, depositing an electrolytic bright acid copper layer over either an electroless nickel or electroless copper layer can provide a mirror like finish. As discussed below, typically, this layer is relatively thin compared to traditional plating on plastic practices. In accordance with a preferred embodiment, the thickness of a bright acid copper is preferably no more than 10 microns while deposits in typical plating on plastic are usually 20 microns or more. However, it will be appreciated that the thickness of the bright acid copper can be more or less than 10 microns. For example, it can have a thickness between 1 and 20 microns.

As mentioned, the present invention can also be utilized in a variety of different industries and for different applications. As discussed above, alternative non-electrolytic plating techniques can be utilized. For example, immersion plating techniques are often employed. Immersion plating involves the deposition of a more noble metal on a substrate of less noble, more electronegative metal by chemical replacement from an aqueous solution of a metallic salt of the coating metal. Immersion plating differs from electroless plating, which involves plating in an autocatalytic plating bath containing reducing agents that chemically reduce metallic ions in the bath to facilitate metal deposition on a substrate surface. A number of commercial immersion silver products are readily available and known.

In accordance with a preferred embodiment, after the thin metal layer 20 has been deposited on the lightly roughened surface 10, a coating 22 (FIG. 5) is deposited over the metal layer 20 to provide protection from the environment. While the coating 22 is intended to provide increased durability, it must be transparent or have sufficient translucence to allow the metal finish to be seen therethrough. While it was found that the quality of the electroless metal deposits on a lightly etched plastic surface were reflective and had good adhesion, the thin metal films could be easily removed by a simple water soak and could tarnish when left in the open air. Once covered with an appropriate layer or coating 22, the metal finish will not tarnish and also has surprising durability as evidenced by the ability to survive prolonged water immersion, humidity and corrosive environment exposure. Articles that were plated by the described process and subsequently coated with an appropriate organic finish were both durable and bright. The coating 22 is preferably an organic layer that transparent or optically transmissive and therefore allows the metal finish to be seen while also providing sufficient protection as described. However, the coating 22 can also be tinted, adjusted for gloss or can have other special optical effects added as desired. Furthermore, the coating also provides excellent resistance against corrosion.

Protection of the thin layer of brilliant silver, nickel or other metal deposit can be achieved with a variety of organic finish chemistries and application methods. While the coating can be clear or tinted, it will retain some level of optical transmittance to allow the underlying metal deposition to be visible. As will be readily understood by one of ordinary skill in the art, the proper choice of coating depends upon the physical properties of the underlying plastic substrate and on the type of metal deposit chosen. Important finish system properties include adhesion to the metal deposit, corrosion protection, resistance to chemical attack, surface scratch and mar resistance, and long term weathering resistance.

Figure 7:
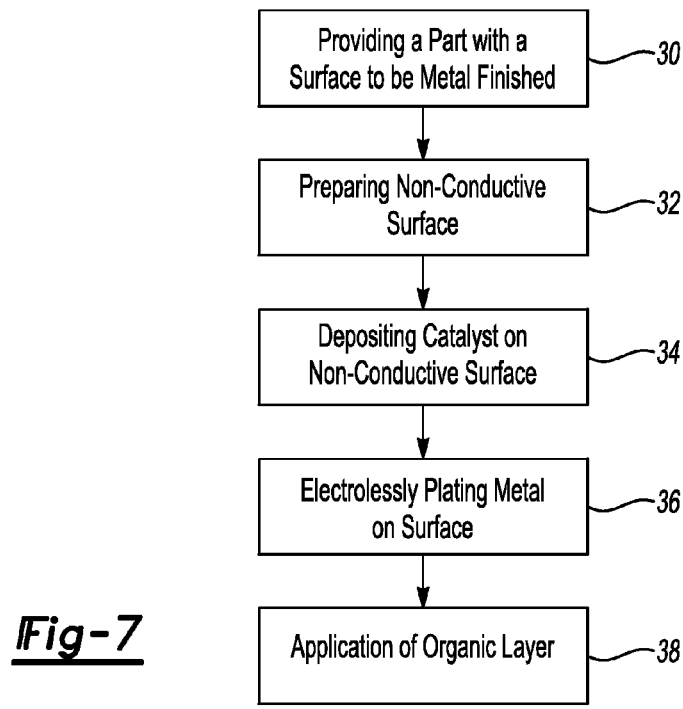
FIG. 7 is a schematic flow chart illustrating a process of forming a metal finish on a non-conductive part in accordance with a preferred embodiment of the present invention.

Referring now to FIG. 7, which schematically illustrates a preferred method for preparing the decorative finish on a non-conductive substrate in accordance with a preferred embodiment. Initially, a part with one or more non-conductive surfaces that are to be subjected to a metal finishing process is provided, as generally indicated by reference number 30. Next, the surface of the non-conductive substrate is prepared to facilitate deposition of an electroless plate or other non-electrolytic deposit, as generally indicated by reference number 32. In accordance with a preferred embodiment, the surface of the non-conductive substrate part is mildly or lightly etched, as discussed above. In accordance with a preferred embodiment, the surface is prepared to impart a root mean square (rms) surface roughness of from 0.002 μm (2 nm) to about 0.10 μm (100 nm) in those areas of the article that are to be provided with the decorative metal finish. However, it will be understood that a variety of other ranges or surface roughness can qualify as mild surface roughening. The preferred range of surface roughness is less than 50 nm. As just one example reflected in the table above, the mild surface roughness was 2 nm greater than that of the as molded material. Additionally, any suitable surface preparation process can be utilized.

As discussed above, the substrate that is subjected to a mild roughening is preferably a non-conducting material. A preferred non-conducting material is ABS. However, other surface modification techniques that would yield a mildly or lightly roughened surface may be employed that allow a multiple of other resins to be used including, but not limited to polyolefins, polyimides, polycarbonates, polyacrylics, polyesters, polyamides, polyepoxies, polyurethanes, polyureas, polypropylene oxides, polyphenylene oxides, thermal plastic olefins, etc. Additionally, blends of two or more different polymers can be included in the process, such as PC/ABS and others. Other suitable surface activation techniques include chemical oxidation, electrolytic oxidation, plasma oxidation, sulfonation, alkaline hydrolysis, and/or acid hydrolysis. These techniques convert a hydrophobic substrate surface to a hydrophilic surface and/or make the surface more hydrophilic, without undesirably over-roughening the surface. It will be understood that other chemistries may be employed that convert a hydrophobic plastic surface to a hydrophilic surface with the catalytic properties sufficient to initiate electroless plating can also be utilized.

In accordance with a preferred embodiment, the non-conducting surface is prepared by an etching process. To perform the etching process, either a chromic or sulfuric acid is preferably used. However other suitable processes for roughening the surface can be employed. In accordance with a preferred embodiment, the ideal etching will leave a surface roughness of less than 30 nm RMS (root means square). The etch conditions can vary and include time, temperature, and concentration of the acid. Preferable ranges for the etch bath variables are as follows: 200-400 g/L CrO3; 200-600 ml/L sulfuric acid; 0-20 g/L Cr (III); bath temp in the range of room temperature to 180° F.; and etch time 10 seconds to 20 minutes. Obviously, the ranges for these conditions can vary.

In accordance with a preferred method, a catalyst is next disposed on the etched surface to create a catalytic surface, as generally indicated by reference number 34. In accordance with a preferred embodiment, a catalytic surface is obtained by absorption of a precious metal cation, such as $Pd^{2+}$, $Ag^+$, $Au^+$, or $Pt^+$, and/or nanoscopic precious metal particles, such as Pd, Ag, Au or Pt. It will be understood that the catalyst and acceleration chemistry can be obtained from a variety of commercial plating suppliers and that other precious metals can be employed to create a catalytic surface. An alternative technique for creating a surface receptive to catalysis is to selectively react with a filler on the surface. In the case of ABS, the polybutadiene is selectively reacted leaving a skeleton of SAN on the surface. Other fillers that may alternatively be utilized include, silicas, glass, alumina, magnesium oxide, ceramic particles, and rubbers or elastomers. Obviously, other fillers may also be utilized.

Thereafter, a thin metal layer is electrolessly plated to the lightly roughened non-conducting surface, as generally indicated by reference number 36. As is known, electroless plating is a technique where a surface of the material is activated and subsequently submerged in an electroless plating bath typically comprising a salt of the metal to be plated and a reducing agent, whereby the metal is deposited on the substrate surface without having to pass an electric current through the bath. Preferable electroless plating includes electroless nickel plating or electroless copper plating. The chemistry is adapted to control particulate sizes of the grain structure. This has the effect of filling gaps more efficiently and creating a so-called "bright" finish. However, other types of electroless plating may be employed, including various physical vapor deposition and chemical vapor deposition processes, and immersion plating, as previously discussed.

Lastly, a finish 22, such as an organic finish, is applied over the thin metal layer 20, as generally indicated by reference number 38. However, an inorganic finish or top coat may also be utilized. The finish or top coat 22 is intended to protect and preserve the metal finish, including the thin metal layer 20. In one embodiment, the top coat layer 22 is optically transmissive to allow the metal finish to be seen. These top coats are defined by their respective polymer backbones. Suitable choices include, but are not limited to: polyacrylate, polyurethane, polyepoxy, polysiloxane, polyester, polysilazane, and/or fluoropolymer. Although single coat finishes are possible, two coat "base/clear" coating systems using 2K urethane chemistry are preferred. These systems involve application of a polyisocyanate catalyzed/hydroxyl functional acrylic polyol using wet-on-wet process followed by a "low bake" cure at 160-180° F. for 30-60 minutes. A variety of finishes can be utilized and several commercially available finishes have proven effective in this application. One preferred system is available from Red Spot & Varnish Co., consists of a low bake 2K urethane base coat and a low bake 2K urethane top coat. The two coat system is applied using conventional air atomizing spray equipment in a wet-on-wet method before final paint cure for thirty minutes at 180° F. Obviously, other layers or finishes can also be utilized and may include more than two layers. Common forms of application include spray coating (conventional or electrostatic), flow coating, curtain coating, dip coating and/or electrolytic deposition. The preferred application method employs electrostatic HVLP and atomizing bell spray guns.

After the top coat layer is applied, the metal finish is protected from corrosion (i.e. corrosion resistant) and provides sufficient durability. Also, the metal finish is visible through the layer. Additionally, a paint layer can also be applied over the layer as desired.

Figure 8A:
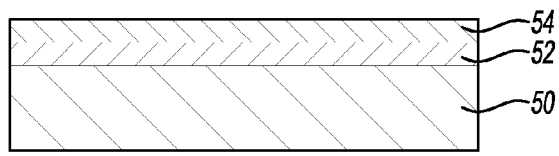
FIG. 8a is a schematic illustration of a metal finish employing a thin layer of bright electroless nickel on a non-conductive surface in accordance with one preferred embodiment of the present invention.

As mentioned, various embodiments for metal finishes can be constructed in accordance with the present invention. Various alternative exemplary constructions are identified below. The first category of potential constructions involve bright electroless Nickel deposited on a plastic surface and are schematically illustrated in FIGS. 8a, b, c. In accordance with one embodiment shown in FIG. 8a, a plastic substrate 50 has a lightly roughened surface. A thin layer of bright electroless nickel 52 is plated on the lightly roughened plastic surface and then a protective topcoat or organic layer 54 is applied thereover. The thickness of the bright electroless layer is in the range of 50 nm to 500 nm and thus is significantly thinner than metal layers in prior metal finishes.

Figure 8B:
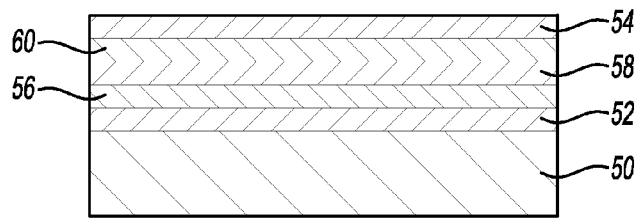
FIG. 8b is a schematic illustration of a metal finish employing a thin layer of bright electroless nickel on a non-conductive surface in accordance with another preferred embodiment of the present invention.

FIG. 8b illustrates another preferred embodiment including a plastic substrate surface 50 with a lightly roughened surface. A thin layer of bright electroless nickel 52 is plated on the lightly roughened plastic surface. An electroless copper 56 is deposited over the thin layer of bright nickel 52. Additionally, an acidic copper layer 58 can be optionally deposited over the electroless copper layer 56. In this embodiment, the substrate is then subjected to a silver immersion process, as discussed above, to deposit a thin silver layer 60 thereon. The total thickness of metal deposited on the substrate is still thin. For example, the thickness of the bright electroless nickel layer is in the range of 50-500 nm, the thickness of the electroless copper layer is in the range of 50-500 nm, and the thickness of the acidic copper layer is between 1-10 µm. Finally, a top coat layer 54 is applied over top of the layers.

Figure 8C:
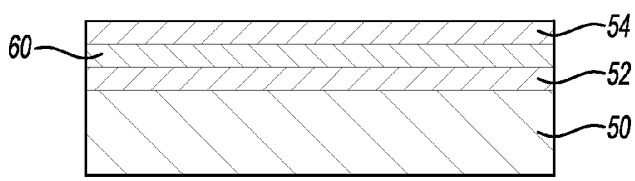
FIG. 8c is a schematic illustration of a metal finish employing a thin layer of bright electroless nickel on a non-conductive surface in accordance with still another preferred embodiment of the present invention.

FIG. 8c illustrates still another preferred embodiment of the present invention in this category. In accordance with this embodiment, a thin layer of bright electroless nickel 52 is plated on a lightly roughened plastic surface 50. The surface is then subjected to silver immersion to deposit a layer of silver 60 thereon. The total thickness of the metal layer is still thin as the thickness of the bright electroless nickel layer is in the range of 50-500 nm. Next, a top coat layer 54 is applied thereover.

Figure 9A:
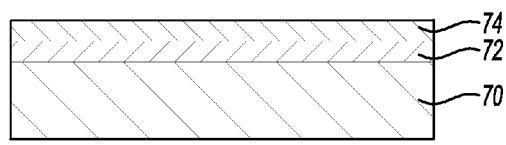
FIG. 9a is a schematic illustration of a metal finish employing a thin layer of electroless nickel on a non-conductive surface in accordance with one preferred embodiment of the present invention.

The second category of potential constructions involve electroless nickel bonded to plastic and are schematically illustrated in FIGS. 9a, b, c. In accordance with one embodiment shown in FIG. 9a, the substrate surface 70 is plastic with a lightly roughened surface. A thin layer of electroless nickel 72 is plated on the lightly roughened plastic surface 70 and then a protective topcoat or organic layer 74 is applied thereover. Again, the thickness of the metal layer is much thinner than with prior metal finishes. The total thickness of the metal deposit is in the range of 50-500 nm for the electroless nickel layer.

Figure 9B:
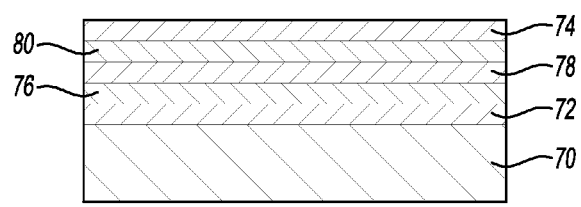
FIG. 9b is a schematic illustration of a metal finish employing a thin layer of electroless nickel on a non-conductive surface in accordance with another preferred embodiment of the present invention.

FIG. 9b illustrates another preferred embodiment including a plastic substrate surface 70 a lightly roughened surface. A thin layer of electroless nickel 72 is plated on the lightly roughened plastic surface 70. An electroless copper layer 76 is deposited over the thin layer of nickel 72. Additionally, an acidic copper layer 78 can be optionally deposited over the electroless copper layer 76. In this embodiment, the substrate is then subjected to a silver immersion process, as discussed above, to deposit a layer of silver 80 thereon. Again, the thickness of the metal layer is thin. The thickness of the electroless nickel layer is in the range of 50-500 nm, the thickness of the electroless copper layer is in the range of 50-500 nm, and the thickness of the acidic copper layer is between 1-10 µm. Finally, a top coat layer 74 is applied over top of the layers.

Figure 9C:
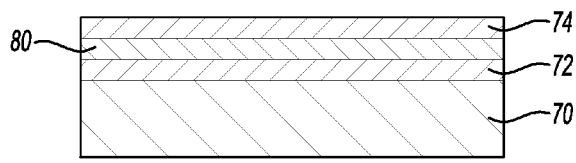
FIG. 9c is a schematic illustration of a metal finish employing a thin layer of electroless nickel on a non-conductive surface in accordance with still another preferred embodiment of the present invention.

FIG. 9c illustrates still another preferred embodiment of the present invention in this category. In accordance with this embodiment, a thin layer of electroless nickel 72 is plated on a lightly roughened plastic surface 70. The surface 70 is then subjected to silver immersion to deposit a layer of silver 80 thereon. The total thickness of the metal layer is thin when compared to prior metal finishes. The thickness of the electroless nickel layer is in the range of 50-500 nm. Next, a top coat layer 74 is applied thereover.

Figure 10A:
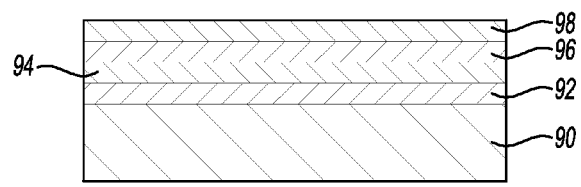
FIG. 10a is a schematic illustration of a metal finish employing a thin layer of electroless copper on a non-conductive surface in accordance with one preferred embodiment of the present invention.

The third category of potential constructions involve electroless copper bonded to plastic and are schematically illustrated in FIGS. 10a, b, c, d. In accordance with one embodiment shown in FIG. 10a, the substrate surface 90 is plastic with a lightly roughened surface. A thin layer of electroless copper 92 is plated on the lightly roughened plastic surface 90. Additionally, an acidic copper layer 94 can be optionally deposited over the electroless copper layer 92. In this embodiment, the substrate 90 is then subjected to a silver immersion process, as discussed above, to deposit a layer of silver 96 thereon. Again, the thickness of the metal layer is much thinner than with prior metal finishes. The total thickness of the metal deposit is in the range of 50-500 nm for the electroless copper layer and the acidic copper layer has a thickness of about 1-10 µm. Finally, a top coat layer 98 is applied over top of the layers.

Figure 10B:
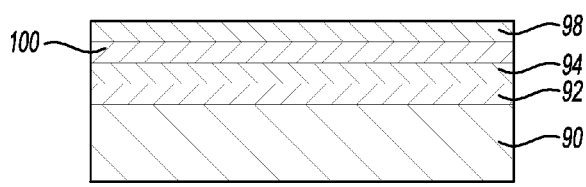
FIG. 10b is a schematic illustration of a metal finish employing a thin layer of electroless copper on a non-conductive surface in accordance with another preferred embodiment of the present invention.

FIG. 10b illustrates another preferred embodiment including a plastic substrate surface 90 with a lightly roughened surface. A thin layer of electroless copper 92 is plated on the lightly roughened plastic surface. Additionally, an acidic copper layer 94 can be optionally deposited over the electroless copper layer 92. In this embodiment, an electroless nickel layer 100 is then deposited over the acidic copper layer 94. The total thickness of the electroless copper layer is in the range of 50-500 nm, the acidic copper layer has a thickness of about 1-10 μm, and the optional layer of electroless nickel has a thickness in the range of 50-500 nm. A top coat layer 98 is then applied over top of the layers.

Figure 10C:
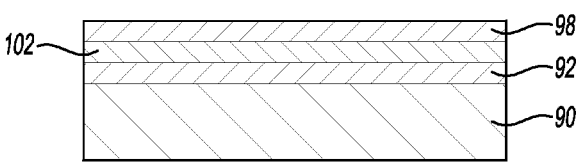
FIG. 10c is a schematic illustration of a metal finish employing a thin layer of electroless copper on a non-conductive surface in accordance with still another preferred embodiment of the present invention.

FIG. 10c illustrates still another preferred embodiment including a substrate surface 90 comprised of plastic with a lightly roughened surface. A thin layer of electroless copper 92 is plated on the lightly roughened plastic surface 90. A thin layer of bright electroless nickel 102 is then deposited over the electroless copper layer 92. The total thickness of the metal deposit in this embodiment is in the range of 50-500 nm for each of the electroless copper and bright electroless nickel layers. Thereafter, a top coat layer 98 is applied over top of the layers.

Figure 10D:
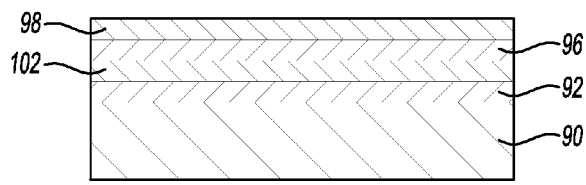
FIG. 10d is a schematic illustration of a metal finish employing a thin layer of electroless copper on a non-conductive surface in accordance with a further preferred embodiment of the present invention.

FIG. 10d illustrates yet a further preferred embodiment including a substrate surface 90 consisting of a plastic with a lightly roughened surface. A thin layer of electroless copper 92 is deposited over the plastic. A thin layer of bright electroless nickel 102 is then applied over the layer of electroless copper 92. In this embodiment, the substrate 90 is then subjected to a silver immersion process, as discussed above, to deposit a layer of silver 96 thereon. The total thickness of the metal deposit in this embodiment is in the range of 50-500 nm for each of the electroless copper and bright electroless nickel layers. Finally, a top coat layer 98 is applied over top of the layers.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An injection molded plastic article with a decorative metal finish, comprising:
   at least one injection molded plastic surface having a light surface roughness of about 0.02 um to 0.1 um root mean square (rms) roughness to improve its adherence capabilities;
   a thin first metal layer non-electrolytically deposited in an aqueous solution on substantially all of said at least one injection molded plastic surface; and
   at least one translucent coating disposed on said thin first metal layer to provide increased durability for the metal finish and to allow the decorative metal finish to remain visible therethrough.

2. The decorative metal finish of claim 1, wherein said at least one injection molded plastic surface is a polymeric material.

3. The decorative metal finish of claim 2, wherein said polymeric material is selected from Acrylonitrile Butadiene Styrene terpolymer, polycarbonate, a blend of an Acrylonitrile Butadiene Styrene terpolymer and a polycarbonate, a thermoplastic polyolefin, and polyamide.

4. The decorative metal finish of claim 1, wherein said light surface roughness of said at least one injection molded plastic surface is an rms of about 0.02 um.

5. The decorative metal finish of claim 1, wherein said thin first metal layer is comprised of a metal selected from nickel, silver, copper, and cobalt.

6. The decorative metal finish of claim 1, further comprising:
   a thin second metal layer deposited over said thin first metal layer.

7. The decorative metal finish of claim 6, wherein said thin second metal layer has a thickness of about 50-500 nm.

8. The decorative metal finish of claim 6, wherein said thin second metal layer is comprised of a metal selected from silver, nickel, copper, cobalt, tin, palladium, rhodium, ruthenium and platinum.

9. The decorative metal finish of claim 6, wherein said thin second layer of metal is deposited on the thin first metal layer in connection with an immersion plating solution comprising a tarnish inhibitor.

10. The decorative metal finish of claim 1, wherein said thin first metal layer has a thickness of about 50 nm to 500 nm.

11. The decorative metal finish of claim 10, wherein said thin first metal layer has a thickness of about 100 nm.

12. The decorative metal finish of claim 1, wherein said first thin metal layer is non-electolytically deposited using an electroless plating technique.

13. The decorative metal finish of claim 1, wherein said at least one translucent coating is selected from a polyacrylate, a polyurethane, a polyepoxy, a polyester, a polyether, a polysiloxane, polysilazane and a fluoropolymer.

14. The decorative metal finish of claim 1, wherein said at least one translucent coating includes multiple layers.

15. The article of claim 1, wherein said at least one injection molded plastic surface has a complex curvature.

16. An injection molded plastic article having a decorative metal finish comprising:
   at least one injection molded non-planar plastic surface having a light surface roughness of about 0.02 um to 0.1 um root mean square (rms) roughness;
   a thin first metal layer disposed directly on said at least one injection molded non-planar plastic surface in an aqueous bath, said thin first metal layer being applied to a considerable portion of said at least one injection molded non-planar plastic surface;
   a translucent coating disposed on said thin first metal layer to provide durability to and visibility of the decorative metal finish.

17. The article of claim 16, wherein said at least one injection molded non-planar plastic surface is a polymeric material.

18. The article of claim 17, wherein said thin first metal layer has a thickness in the range of 50 nm to 500 nm.

19. The article of claim 17, wherein said thin first metal layer is a bright electroless nickel.

20. The article of claim 19, wherein a thin second metal layer is deposited over said thin first metal layer.

21. The article of claim 20, wherein said thin second metal layer is an electroless copper.

22. The article of claim 21, wherein an acidic copper layer is deposited over said thin second metal layer.

23. The article of claim 22, wherein a layer of silver is deposited over said acidic copper layer.

24. The article of claim 19, wherein a layer of silver is deposited over top of said thin first metal layer.

25. The article of claim 17, wherein said thin first metal layer is an electroless nickel.

26. The article of claim 25, wherein a thin second metal layer of electroless copper is deposited over said thin first metal layer of electroless nickel.

27. The article of claim 26, wherein a thin layer of acidic copper is deposited over said thin second metal layer of electroless copper.

28. The article of claim 27, wherein a thin layer of silver is deposited over said thin layer of acidic copper.

29. The article of claim 26, wherein a thin layer of silver is deposited over said second layer of electroless copper.

30. The article of claim 17, wherein said thin first metal layer is an electroless copper.

31. The article of claim 30, wherein a thin layer of acidic copper is deposited over said thin first metal layer is an electroless copper.

32. The article of claim 31, wherein a thin layer of silver is deposited over said thin layer of acidic copper.

33. The article of claim 31, wherein a thin layer of electroless nickel is deposited over said thin layer of acidic copper.

34. The article of claim 30, wherein a thin layer of bright electroless nickel is deposited over said thin first metal layer of electroless copper.

35. The article of claim 34, wherein a thin layer of silver is deposited over said thin layer of bright electroless nickel.

36. The article of claim 16, wherein said at least one injection molded non-planar plastic surface has a complex curvature.

37. The article of claim 16, wherein the article is three dimensional.

38. The article of claim 16, wherein said translucent coating consists of multiple layers.

* * * * *

UNITED STATES PATENT AND TRADEMARK OFFICE
CERTIFICATE OF CORRECTION

PATENT NO. : 8,632,864 B2  
APPLICATION NO. : 12/545926  
DATED : January 21, 2014  
INVENTOR(S) : Hao et al.

Page 1 of 1

It is certified that error appears in the above-identified patent and that said Letters Patent is hereby corrected as shown below:

Specification

| | |
|---|---|
| Column 3, Line 31 | "inventions" should read -- "invention" -- |
| Column 7, Line 26 | "BUTADINENE" should read -- "BUTADIENE" -- |
| Column 12, Line 39 | "FIG. 9e" should read -- "FIG. 9c" -- |

Claims

| | |
|---|---|
| Claim 4, Column 13, Line 64 | "an rms of" should read -- "an rms roughness of" -- |

Signed and Sealed this  
Twenty-fourth Day of June, 2014

Michelle K. Lee  
*Deputy Director of the United States Patent and Trademark Office*